United States Patent
Wu et al.

(10) Patent No.: US 6,981,114 B1
(45) Date of Patent: Dec. 27, 2005

(54) SNAPSHOT RECONSTRUCTION FROM AN EXISTING SNAPSHOT AND ONE OR MORE MODIFICATION LOGS

(75) Inventors: Weibao Wu, Roseville, MN (US); Sinh D. Nguyen, Eden Prairie, MN (US); Kirk W. Clowser, Dellwood, MN (US)

(73) Assignee: VERITAS Operating Corporation, Mountain View, CA (US)

( * ) Notice: Subject to any disclaimer, the term of this patent is extended or adjusted under 35 U.S.C. 154(b) by 288 days.

(21) Appl. No.: 10/271,452

(22) Filed: Oct. 16, 2002

(51) Int. Cl.[7] ............................................. G06F 12/16
(52) U.S. Cl. ..................... 711/162; 711/112; 711/114; 711/161
(58) Field of Search ..................... 711/161, 162, 112, 711/114, 6; 707/201–204

(56) References Cited

U.S. PATENT DOCUMENTS

| | | | |
|---|---|---|---|
| 5,089,958 A | | 2/1992 | Horton et al. ................. 714/5 |
| 5,649,152 A | | 7/1997 | Ohran et al. ................. 711/114 |
| 5,870,758 A | * | 2/1999 | Bamford et al. ............. 707/201 |
| 6,131,148 A | * | 10/2000 | West et al. ................. 711/162 |
| 6,473,775 B1 | * | 10/2002 | Kusters et al. .............. 707/200 |
| 6,678,809 B1 | * | 1/2004 | Delaney et al. ............. 711/162 |
| 6,732,125 B1 | * | 5/2004 | Autrey et al. ............... 707/204 |
| 6,748,504 B2 | * | 6/2004 | Sawdon et al. ............. 711/162 |
| 6,751,715 B2 | * | 6/2004 | Hubbard et al. ............. 711/162 |
| 6,771,843 B1 | | 8/2004 | Huber et al. ................ 382/305 |
| 6,792,518 B2 | | 9/2004 | Armangau et al. ......... 711/162 |
| 6,820,099 B1 | | 11/2004 | Huber et al. ................ 707/204 |
| 6,877,109 B2 | * | 4/2005 | Delaney et al. ................. 711/6 |

* cited by examiner

*Primary Examiner*—T Nguyen
(74) *Attorney, Agent, or Firm*—Meyertons Hood Kivlin Kowert & Goetzel, P.C.; B. Noël Kivlin

(57) ABSTRACT

A deleted snapshot of a data volume may be reconstructed from an existing snapshot and one or more modification logs. For example, modifications to the data volume that occur subsequent to creation of a first snapshot may be logged in a modification log. If the first snapshot is deleted, the first snapshot may be reconstructed by modifying a second snapshot, created after the first snapshot, according to the modification log in order to undo any modifications made to the data volume prior to creation of the second snapshot and after creation of the first snapshot.

25 Claims, 8 Drawing Sheets

SNAPSHOT RECONSTRUCTION FROM AN EXISTING SNAPSHOT AND ONE OR MORE MODIFICATION LOGS

BACKGROUND

1. Field of the Invention

This invention relates to data protection and, more particularly, to techniques for reconstructing deleted snapshot copies of a data volume.

2. Description of the Related Art

Many business organizations and governmental entities rely upon applications that access large amounts of data, often exceeding a terabyte or more of data, for mission-critical applications. It is common that many such applications require near-continuous access. For example, many systems such as retail processing databases, airline reservation databases, and financial institution databases must be available to perform transaction processing 24 hours a day. Downtime associated with such systems can be disastrous.

With the growing amounts of data and shrinking acceptable downtime requirements of modem systems, organizations are sometimes forced to choose between the conflicting demands associated with modem systems. For example, secondary operations such as data backup operations, reporting and analysis, and application testing can be of significant importance. However, such secondary operations can interrupt or encumber the normal transaction processing of a host system running a database application.

To minimize these problems, some systems support snapshot capabilities that allow point-in-time copies of data to be created. By creating snapshots of the appropriate storage devices, a frozen image of the volume can be created and can then be used to facilitate the secondary operations. For example, the snapshot copies containing the image can be installed on a secondary host that performs the secondary operations. In this manner, availability of the primary host for normal transaction processing can be maximized.

The creation of snapshot copies can be based on data-mirroring technology implemented by a volume manager running on the host system. In a data mirroring configuration, identical copies of data are stored on different physical storage devices. A volume-level snapshot can be created simply by splitting and detaching a mirror containing an image of the data from the original volume. Once the user has completed use of the snapshot volume split from an original, it may be resynchronized (since continued updates to the original volume may have occurred) by reattaching it to the original. Subsequent snapshots may be taken in a similar manner.

While the volume level snapshot capabilities of a volume manager may be utilized to create a snapshot of a data volume, several significant problems may be presented. Snapshots are typically kept online (e.g., in a quickly accessible storage media such as a local disk drive). Accordingly, snapshots can typically be accessed much more quickly than backups, which are typically kept in an offline storage media (e.g., a tape within a tape library). Thus, if a data error can be corrected from a snapshot, the recovery may be much less time-consuming than if the data error can only be corrected from a backup. However, since there is usually a limited amount of online storage space, the number of snapshots that can be maintained is fairly small. Thus, in many systems, the oldest snapshot may be deleted in order to free room for a newer snapshot.

Some systems may provide enough online storage to store a relatively large number of snapshots. These systems may provide additional history through snapshots, allowing more data recovery to take place via online snapshots as opposed to offline backups. However, managing a large number of snapshots may be undesirably complex. If the snapshots are managed by software, the software may require more system resources than the user applications running on the system. Accordingly, the complexity and overhead of snapshot management may itself limit the number of snapshots maintained by a system. It is desirable to be able to gain the added protection provided by maintaining larger numbers of snapshots without the associated overhead and storage constraints.

SUMMARY

Various systems and methods for reconstructing a deleted snapshot of a data volume from an existing snapshot and one or more modification logs are provided. In one embodiment, a method involves creating a first snapshot of a data volume; logging modifications to the data volume in one or more modification logs, where the modifications occur subsequent to creating the first snapshot; creating a second snapshot subsequent to said creating the first snapshot; and if the first snapshot is deleted, reconstructing the first snapshot by modifying the second snapshot according to the modification log(s). In some embodiments, a similar method may be implemented in a computer system that includes one or more microprocessors and a memory or other computer readable medium that stores instructions executable by the one or more microprocessors to implement the similar method.

In some embodiments, a computer system may include one or more storage devices (e.g., hard drives or other writeable storage devices), a snapshot manager, and a modification manager. A data volume and one or more snapshots of the data volume may be stored on one or more of the storage devices. The modification manager is configured to log modifications to the data volume relative to a creation time of each of the plurality of snapshots. The snapshot manager is configured to reconstruct a deleted snapshot of the data volume from one of the plurality of snapshots by modifying the one of the plurality of snapshots according to the modifications logged by the modification manager.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
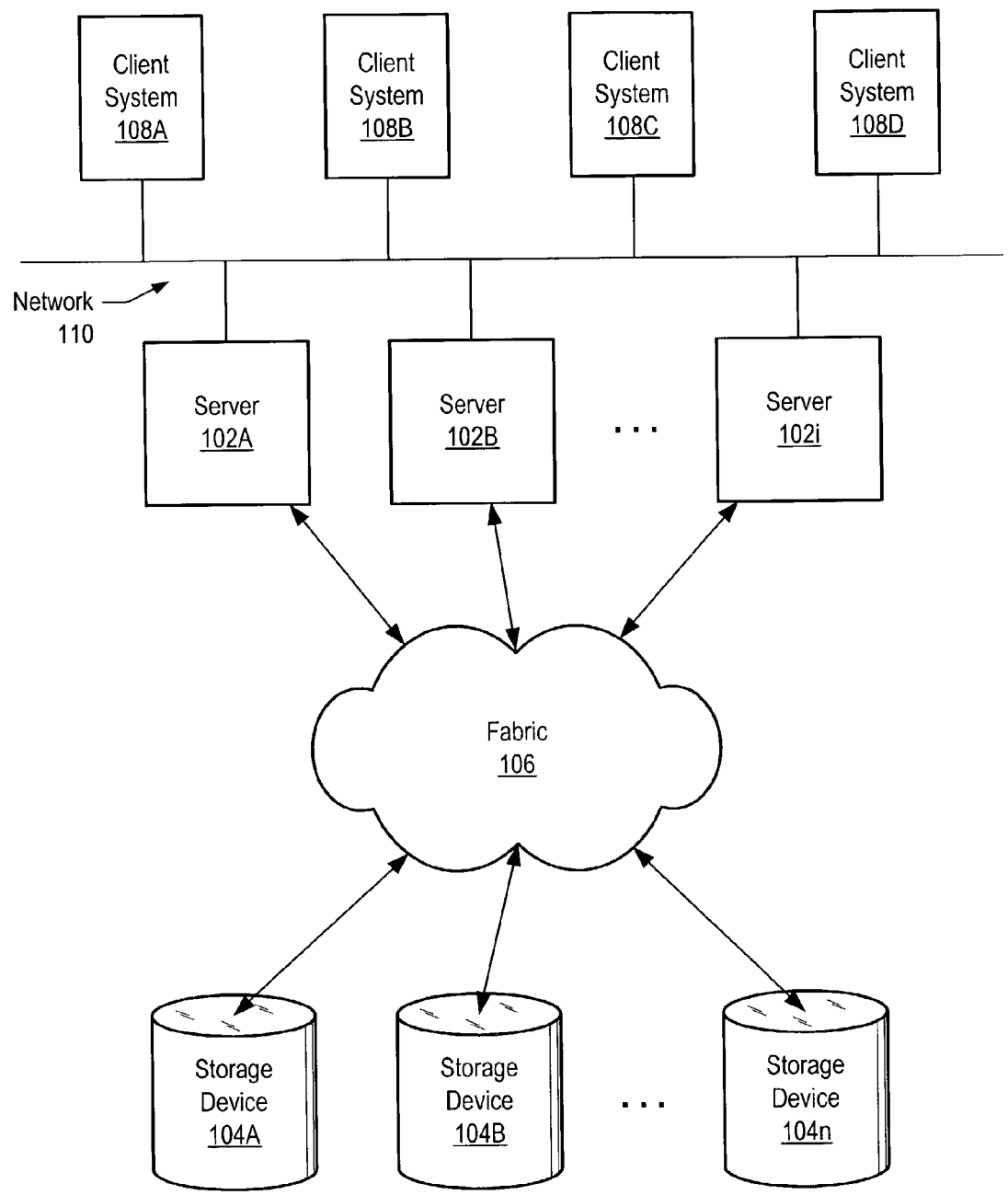
FIG. 1 is a block diagram of one embodiment of a computer system.

FIG. 1 illustrates an exemplary computer system in which embodiments of a snapshot reconstruction mechanism may be implemented. In the illustrated embodiment, a storage area network (SAN) environment is formed by one or more host systems or servers 102 (e.g., servers 102A, 102B and 102i) that are interconnected with one or more associated storage devices 104 (e.g., storage devices 104A, 104B . . . 104x) through an interconnect fabric 106. One or more client systems 108A–108D may access the SAN by accessing one or more of the servers 102 via a network 110. Network 110 may include wired or wireless communication mechanisms such as, for example, Ethernet, LAN (Local Area Network), WAN (Wide Area Network), or modem, among others. Note that throughout this disclosure, drawing features identified by the same reference number followed by a letter (e.g., servers 102A-102i) may be collectively referred to by that reference number alone (e.g., servers 102).

Each of the storage devices 104 may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Servers 102 may run any of a variety of operating systems such as a Unix operating system, Solaris operating system, or a Windows operating system. Each server 102 may be connected to the fabric 106 via one or more Host Bus Adapters (HBAs).

Fabric 106 includes hardware that connects servers 102 to storage devices 104. The fabric 106 may enable server-to-storage device connectivity through Fibre Channel switching technology. The fabric 106 hardware may include one or more switches (also referred to as fabric switches), bridges, hubs, or other devices such as routers, as well as the interconnecting cables (e.g., for Fibre Channel SANs, fibre optic or copper cables), as desired.

In one embodiment, the SAN may use the Network File System (NFS) protocol to provide access to shared files on the SAN. Using NFS, each server 102 may include a logical hierarchy of files (e.g., a directory tree) physically stored on one or more of storage devices 104 and accessible by the client systems 106 through the server 102. These hierarchies of files, or portions or sub-trees of the hierarchies of files, are referred to herein as "file systems." In one embodiment, the SAN components may be organized into one or more clusters to provide high availability, load balancing, and/or parallel processing. For example, in FIG. 1, a selected set of the servers 102A, 102B . . . 102I may be operated in a cluster configuration.

It is noted that while in the embodiments described above, primary host 102a may be coupled to a plurality of storage devices through a storage area network, other embodiments are possible in which primary host 102a is coupled directly to dedicated storage devices.

Figure 2:
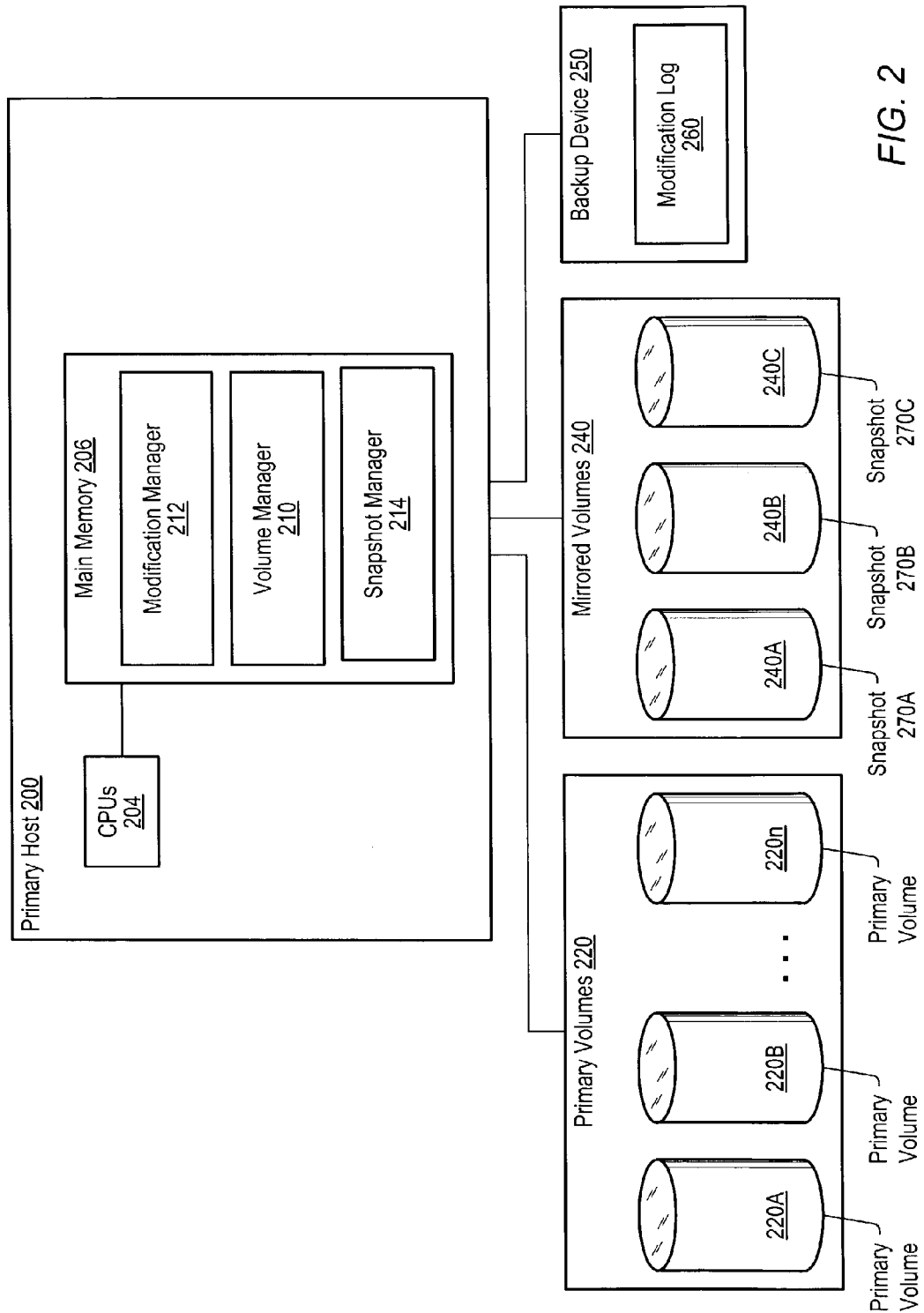
FIG. 2 is a block diagram illustrating a primary host coupled to a plurality of data volumes, according to one embodiment.

FIG. 2 illustrates aspects associated with one of the servers 102, referenced as primary host 200. In general, primary host 200 may include various conventional software and hardware components, as desired. As such, primary host 200 is illustrated with one or more central processing units (CPUs) 204 as well as a main memory 206 for storing instructions and/or data accessible by the CPUs 204. In one embodiment, main memory 206 is implemented using dynamic random access memory (DRAM), although it is noted that in other embodiments, other specific types of memory, or combinations thereof, may be utilized.

FIG. 2 further illustrates various software components executable by CPUs 204 out of a memory medium such as main memory 206. The depicted software components include a volume manager 210. It is noted that these software components may be paged in and out of main memory 206 from a secondary storage medium according to conventional techniques.

The volume manager 210 of FIG. 2 includes functionality to virtualize physical storage accessible by applications running on primary host 200. As used herein, the term "volume manager" broadly refers to host software that selects and combines storage space from more than one physical storage device into a logical volume. The volume manager 210 may support various specific storage management functionality, such as various levels of RAID functionality, including data mirroring and striping. In one embodiment, the volume manager is a Veritas Volume Manager™ product available from Veritas Software Corporation.

As illustrated in FIG. 2, data may span multiple volumes, depicted as primary volumes 220A-220n. Each primary volume 220 may be accessed by user applications (e.g., database applications) through the virtualization functionality provided by volume manager 210. It is noted that each primary volume 220 corresponds to a partitioning of physical storage such as the storage of storage devices 104 of FIG. 1. A volume may be formed by a portion of the overall storage of a physical device, by the storage of an entire physical device, or by the storage of multiple physical storage devices combined. For example, each primary volume may include an array of storage devices 104, as desired.

Volume manager 210 includes functionality to create a snapshot 270 corresponding to an original volume. The original volume may correspond to one or more of the logical volumes 220 or to a portion of one or more of the logical volumes 220. The volume manager 210 may create the snapshot at a volume-level by sequentially storing each data block within the original volume to the snapshot. A block is a unit of storage (e.g., a 512 byte block) that may be written or read as a single I/O operation from the physical storage device.

A snapshot 270 may be created in several ways. In some embodiments, snapshots 270 may be created by defining a virtual device. Whenever the original volume is modified, a copy of the pre-modification value of the modified block may be stored (e.g., in a copy-on-write file). When the snapshot is used (e.g., to make a backup), the virtual device may be read. Read accesses to the virtual device targeting a block that was modified subsequent to the creation of the snapshot may be remapped to the stored copy of the pre-modified value of that block. Thus, use of the virtual device provides a point-in-time copy of the original volume.

In other embodiments, such as the one illustrated in FIG. 2, the volume manager 210 may create a snapshot 270 by mirroring the original volume onto a mirrored volume 240. Each block of the original volume may be initially copied to the mirrored volume 240. The mirrored volume 240 may then be synchronized to the original volume such that write accesses to the original volume also update the mirrored volume 240. At the point in time at which the snapshot 270 is requested, the volume manager 210 may disconnect the mirrored volume 240 from the original volume such that write accesses to the original volume have no effect on the mirrored volume. Thus, the disconnected mirrored volume 240 now represents a snapshot 270 of the original volume. Note that in alternative embodiments, the functionality to create a snapshot may be implemented in another application other than volume manager 210. In some such embodiments, snapshots may be created at a file-system level by accessing a file system and navigating the hierarchical directory of files included therein. Generally, a snapshot may be created in any suitable way that preserves a point-in-time copy of the data stored in the original volume. Mirrored volumes 240 are examples of means for storing snapshots of a data volume.

Volume manager 210 (or another snapshot-generating component) may additionally include functionality to resynchronize a mirrored volume storing a snapshot to the original volume. For example, if a new snapshot is desired and a maximum number of snapshots currently exist within the system, volume manager 210 may resynchronize a disconnected mirrored volume 240 to the original volume, deleting the old snapshot stored by that mirrored volume. Once the mirrored volume 240 is resynchronized to the original volume, the volume manager 210 may disconnect the snapshot mirror, creating a point-in-time snapshot of the original volume.

In the illustrated embodiment of FIG. 2, there are three mirrored volumes 240A–240C storing snapshots 270A–270C respectively. Each mirrored volume may be selectively resynchronized to and disconnected from the original volume at various times such that each mirrored volume stores a different snapshot 270.

Figure 3:
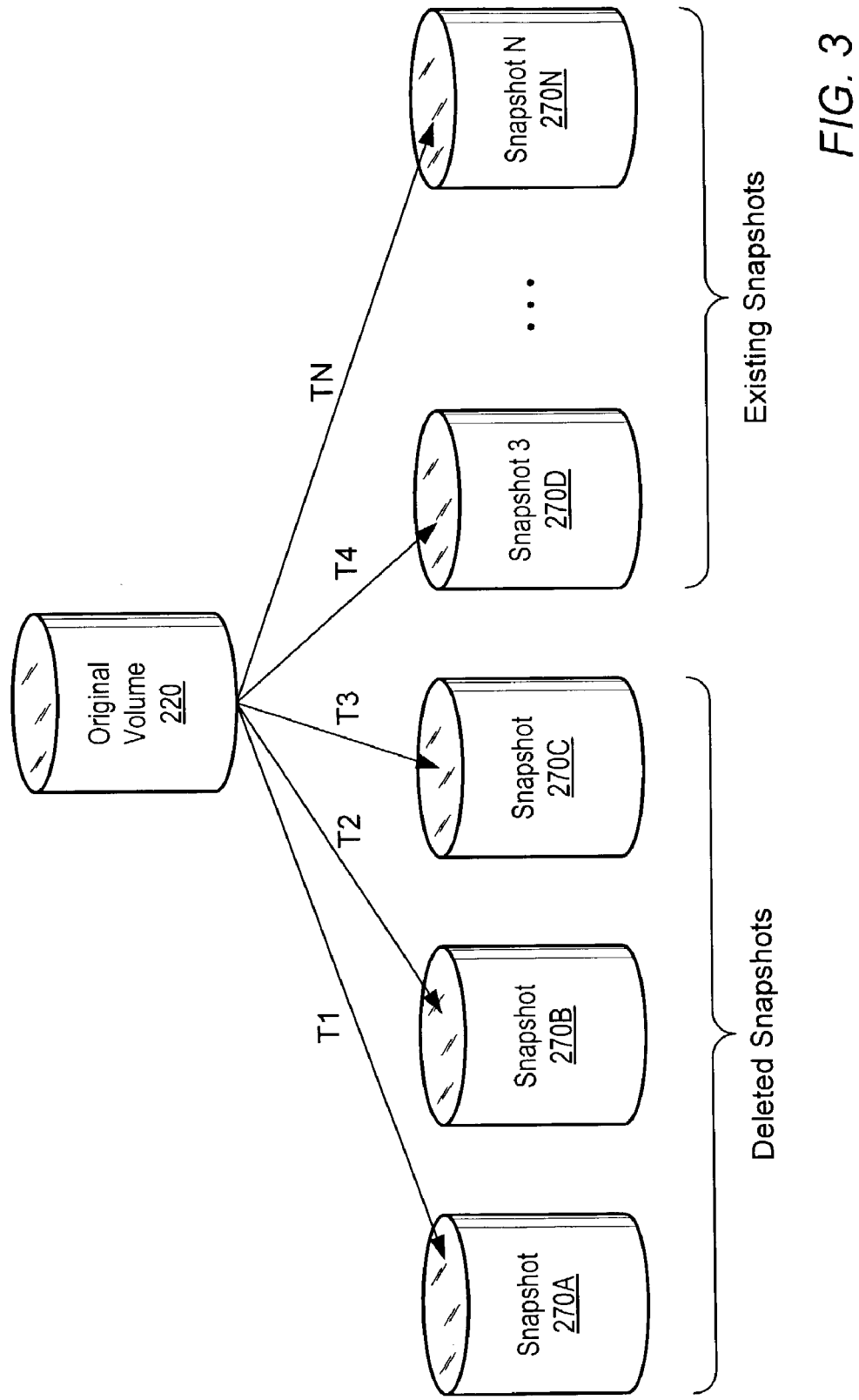
FIG. 3 is a block diagram illustrating several snapshots of a single data volume, according to one embodiment.

FIG. 3 illustrates how several snapshots 270A–270N may be created from the same original volume 220. Each snapshot 270 may be generated at a unique point in time, and thus each snapshot represents a different state of the original volume. In one embodiment, new snapshots may be generated periodically (e.g., every day or every hour). In other embodiments, a new snapshot may be created each time a modification log, which tracks modifications to the original volume relative to the most recently created snapshot, reaches a maximum size. In yet other embodiments, a new snapshot may be generated each time a user requests a snapshot. Many embodiments may create snapshots in response to more than one of these conditions.

A maximum number of snapshots may be stored within a system. This maximum number may be a user-selected number based on the complexities of snapshot management and/or the storage requirements of maintaining snapshots. If the maximum number of snapshots are stored within the system when a new snapshot is created, one of the existing snapshots may be deleted. For example, in one embodiment, the new snapshot may be created by resynchronizing a mirrored volume 240 that, prior to being resynchronized, stored an existing snapshot. Once the mirrored volume is resynchronized to the original volume, the mirrored volume may be disconnected, creating the new snapshot of the original volume. In other embodiments, a snapshot may simply be deleted (e.g., by deallocating blocks allocated to store that snapshot) in order to free storage space for storage of the new snapshot. Each snapshot is stored online on a storage media similar to that on which the original volume is stored.

In FIG. 3, snapshots 270A–270N have been created for an original volume. However, only snapshots 270D–270N are currently in existence in an online storage media. The earlier snapshots 270A–270C have been deleted.

Returning to FIG. 2, modification manager 212 may implement functionality to track modifications to the original volume between any two snapshots (i.e., each modification occurs after one snapshot is created and before another snapshot is created). Modification manager 212 may log detected modifications in one or more modification logs 260. Each time a modification is detected, modification manager 212 may log the time at which the modification occurred, the address(es) of the modified block(s), and the pre- and post-modification values of the modified block(s). In some embodiments, all or part of modification log(s) 260 may be stored on a backup device 250. The backup device 250 may be offline, and thus accessing the modification log(s) may involve waiting for the backup device to enter an online state. As used herein, an offline device is a device, such as tape drive or library of tape drive, that is not immediately accessible to a primary host 200 (e.g., user and/or mechanical intervention may be needed to load the appropriate tape into a tape drive before the desired access can be performed). In other embodiments, all or part of modification log(s) 260 may be stored in memory 206 and/or one or more of primary volumes 220. In some embodiments, modification manager 212 may be implemented in a file system, a kernel driver, and/or a volume manager 210.

Snapshot manager 214 may maintain a history of snapshots 270 created for each original volume and provide access to snapshots 270 currently stored in the system. As used herein, an "existing" snapshot is a non-deleted snapshot that is readily available (e.g., on a mirrored volume 240). Snapshot manager may identify each snapshot 270 with a unique identifier. For example, in one embodiment, snapshots 270 may be successively numbered to indicate the relative order in which they were created. In other embodiments, each snapshot 270 may be time-stamped with a time and/or date. The granularity of the time stamp may correspond to the frequency of snapshot generation such that each snapshot can be uniquely identified from the timestamp. For example, in embodiments where snapshots are generated daily, a suitable timestamp may include a day and year. In contrast, in embodiments where snapshots are generated hourly, a suitable timestamp may include a minute, hour, day, and year. Other embodiments may use other means of uniquely identifying snapshots.

A snapshot 270 may be used for a variety of specific purposes, as desired. For example, a snapshot 270 may be used to create a backup without disrupting access to and/or experiencing synchronization problems with the original volume as much as if the backup was created directly from the original volume. Alternatively, the snapshot of the original volume may be used for reporting and analysis, application testing, etc.

A snapshot 270 may also be used to restore all or part of the original volume to its state at the point in time at which the snapshot was created. Restoring all or part of the original volume from the snapshot, which is stored on an online storage media, may be significantly faster than restoring the primary volume from a backup storage medium, which may be offline and/or have much slower access speeds than the primary volume.

Snapshots 270 may be deleted in order to free room for new snapshots or to simplify snapshot management. For example, as mentioned above, if a mirrored volume 240 is used to store each snapshot, a previously-stored snapshot will be deleted when the mirrored volume is resynchronized to the original volume in order to store a new snapshot. Snapshots may also be deleted due to a storage device failure or data corruption. In general, a snapshot is considered deleted if the snapshot is no longer readily accessible by primary host 200 and/or no longer a reliable indicator of a point-in-time state of the original volume.

A snapshot manager 214 may implement functionality to reconstruct a deleted snapshot from an existing snapshot 240 and the modification log(s) 260. For example, the snapshot manager 214 may reconstruct a deleted snapshot in response to a user initiating a command requesting the deleted snapshot. The user may request a snapshot in order to copy the snapshot to the original volume, restoring the original volume to its state at the point in time at which that snapshot was created.

The snapshot manager 214 may reconstruct the deleted snapshot by modifying an existing snapshot according to one or more modifications identified in the modification log(s). If the deleted snapshot was created before the existing snapshot, the snapshot manager 214 may modify the existing snapshot by sequentially undoing modifications logged in one or more modification logs 260 between the time the existing snapshot was created and the time the deleted snapshot was created. The snapshot manager 214 may undo modifications in reverse of the chronological order in which those modifications were detected. If the deleted snapshot was created after the existing snapshot, the snapshot manager 214 may modify the existing snapshot by sequentially applying modifications logged in the modification log(s) 260 between the time the existing snapshot was created and the time the deleted snapshot was created. The snapshot manager 214 may apply the modifications in the chronological order in which those modifications were detected when reconstructing a deleted snapshot from an earlier-created existing snapshot. Note that an unmodified copy of the existing snapshot may be preserved during the snapshot reconstruction process (i.e., the snapshot reconstruction process may not delete the existing snapshot from which a deleted snapshot is reconstructed). Snapshot manager 214 is an example of a means for reconstructing a deleted snapshot.

Figures 4, 5:
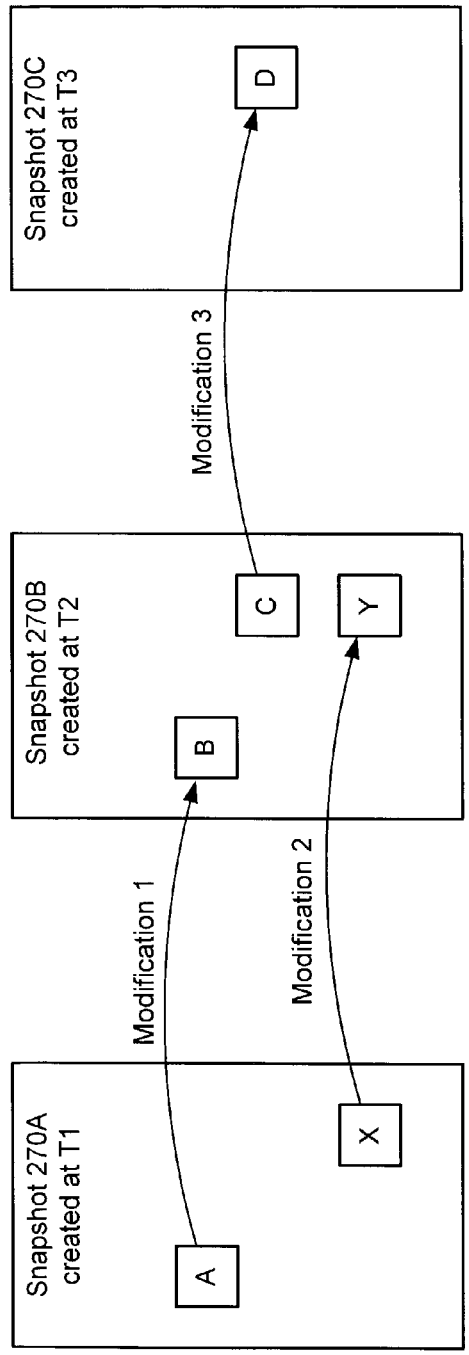
FIG. 4 is a block diagram illustrating modifications that occur between different snapshots, according to one embodiment.
FIG. 5 shows a table used to log modifications in one embodiment.

FIG. 4 illustrates modifications that may occur between the creation times of three snapshots 270A–270C. Between the time T1 at which snapshot 270A is created and the time T2 at which snapshot 270B is created, a first block having value A in snapshot 1 is modified by modification 1 to have value B. Similarly, a second block having value X is modified by modification 2 to have value Y. Between the time T2 snapshot 270B is created and the time T3 snapshot 270C is created, a third block having value C is modified by modification 3 to have value D. These modifications are logged (e.g., by a modification manager 212 or other means for logging modifications to the original volume) in one or more modification logs 260. In some embodiments, a different modification log 260 may exist for each pair of consecutive snapshots. For example, one modification log may log modifications that occur between snapshot creation times T1 and T2, while another modification log may log modifications that occur between snapshot creation times T2 and T3.

FIG. 5 illustrates an exemplary modification log 260 that tracks modifications to the original volume relative to the time at which a snapshot 270 is created. In this exemplary embodiment, the modification log 260 tracks the modifications shown in FIG. 4. When a modification is detected, the modification is time stamped in such a way that the modification can be identified as occurring between the creation of two snapshots. For example, the timestamp of each modification may be the ID of the most recently created snapshot prior to detection of the modification (or, alternatively, the ID that will be used for the next snapshot if snapshot IDs are generated in a predictable fashion). Alternatively, the timestamp may indicate the time (e.g., by specifying the year, day, hour, minute, and/or second) at which the modification is detected.

In addition to storing a timestamp for each entry, the modification log 260 may identify the address of each data block modified by the modification. The modification log may also identify the pre-modification value of each modified block (e.g., by storing a copy of the pre-modified block). In one embodiment, the modification manager or other means for logging modifications may copy the pre-modification value into the modification log 260 from the original volume or from the most recent snapshot at the time of the modification. The modification log may also identify the post-modification value of each modified block. In alternative embodiments, modifications may be tracked by file instead of by block.

Note that other embodiments may log modifications differently than illustrated in FIG. 5. For example, in one embodiment, a modification log 260 may include a bitmap that includes one bit per data block in the original volume. The size of a data block may differ between embodiments. Furthermore, some embodiments may allow the size of a data block to be modified.

A different bitmap may be used for each time period (e.g., T1–T2 or T2–T3) occurring between snapshots. Each bit in the bitmap may be set to a certain value to identify whether an associated block was modified during the associated time period. A separate table or other data structure identifying the pre- and/or post-modification values of any modified blocks identified in a particular bitmap may also (or alternatively) be maintained in some embodiments. When the next snapshot is created (e.g., at T2, if a bitmap is used to log modifications subsequent to T1), the bitmap may be associated with the snapshots created at T1 and/or T2 and a new bitmap may be created.

In many embodiments, the bitmap created between T1 and T2 may be used as an intermediate modification log to create one or more additional modification logs. For example, a "backward" modification log for snapshot 270B that identifies the changes between snapshot 270B and 270A may be created by reading and storing the values of the changed blocks, identified in the bitmap, from snapshot 270B. Similarly, the a "forward" modification log for snapshot 270A that identifies the changes between snapshot 270A and 270B may be created by reading and saving the values of the changed blocks, identified in the bitmap, from snapshot 270A. Snapshot 270A may be recreated from snapshot 270B and the backward modification log for snapshot 270B. Similarly, snapshot 270B may be recreated from snapshot 270A and the forward modification log for snapshot 270A. Note that in such embodiments, multiple modification logs may be used to recreate a snapshot that was created several time periods earlier or later than the existing snapshot from which it is being recreated.

Figure 6:
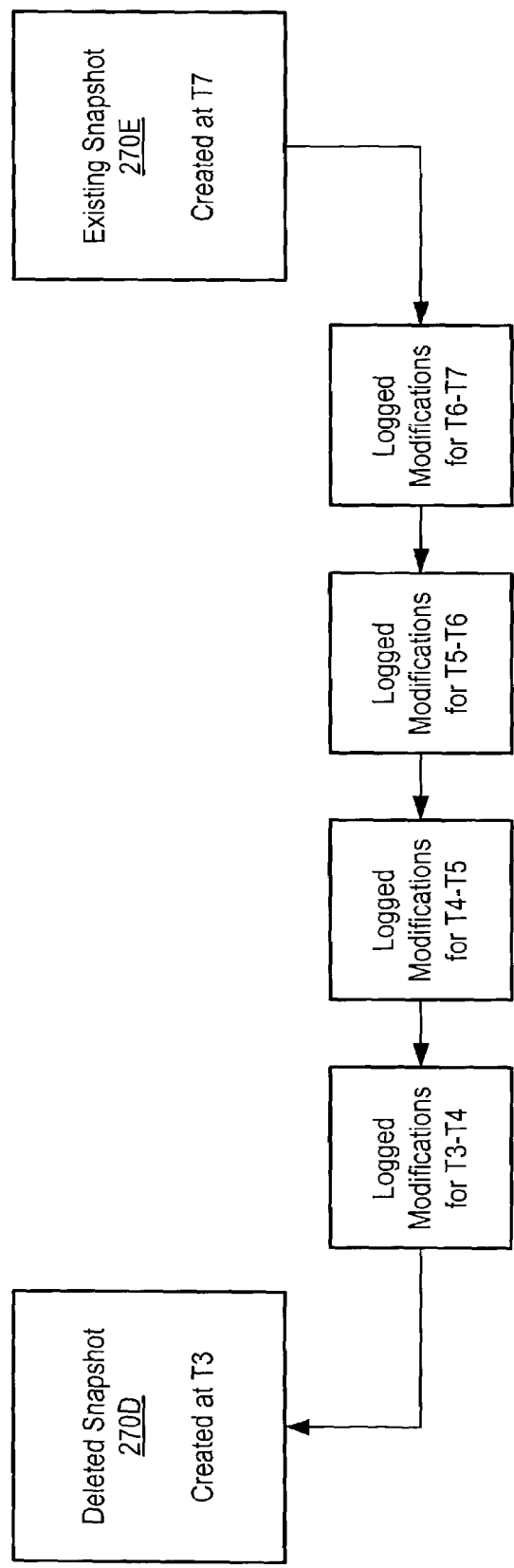
FIG. 6 illustrates reconstruction of a deleted snapshot from an existing snapshot and logged modifications, according to one embodiment.

FIG. 6 illustrates the relationship between a deleted snapshot 270D, created at T3, and an existing snapshot 270E, created at T7, according to one embodiment. The deleted snapshot 270D may be reconstructed from the existing snapshot 270E and the modification log 260. For example, by modifying the existing snapshot 270E to undo the modifications logged between time T6 and T7, time T5 and T6, T4 and T5, and T3 and T4, the deleted snapshot 270D may be reconstructed. For example, if the original volume, of which both the deleted snapshot and the existing snapshot are snapshots, is being restored to its state at T3 from the existing snapshot created at T7 and the modification log(s), the original volume may first be restored to its state at time T7. Then, the snapshot manager 214 may move backward through the modification log(s) 260 from time T7 to time T3, replacing any modified blocks with their pre-modification values.

Note that times T4–T6 may each correspond to a time at which a snapshot was generated in some embodiments. In such embodiments, in order to reconstruct the deleted snapshot 270D created at time T3, three other snapshots (created at T6, T5, and T4) may be temporarily reconstructed if modifications are undone in the reverse chronological order in which they were logged. Alternatively, the snapshot manager 214 may be configured to reconstruct snapshots without applying or undoing modifications in chronological order, and thus intervening snapshots (if any) may not be temporarily reconstructed. Instead, the snapshot manager 214 may compare the modifications in each time period (e.g., by comparing bitmaps identifying modified blocks in each time period) to determine if some blocks were modified in multiple time periods. If a block was modified several times between the time at which the existing snapshot was created and the time at which the snapshot being reconstructed from the existing snapshot was created, the snapshot manager may apply fewer than all of the intervening modifications when reconstructing the deleted snapshot. For example, if the same block was modified between time T5 and T6 and between time T3 and T4, the snapshot manager may only restore that block to its pre-modification value at time T3 without first restoring the block to its pre-modification block at time T5.

In embodiments in which snapshots and modifications are identified by creation time, the snapshot manager 214 may be configured to construct a point-in-time snapshot of the original volume at any time, regardless of whether a snapshot was ever actually created at that time. For example, if snapshots were created at 8 AM and 9 AM, and if modifications were logged as occurring at 8:15, 8:29, and 8:31, the snapshot manager may construct a snapshot of the original volume at 8:30 by undoing changes occurring after 8:30 (i.e., the 8:31 AM modification) in the 9 AM snapshot or by redoing the changes occurring after 8 AM and before 8:30 AM (i.e., the 8:15 and 8:29 AM modifications) in the 8 AM snapshot. Note that at the time the 8:30 AM snapshot is requested, the 8 AM and 9 AM snapshots may already be deleted, and thus some embodiments may reconstruct at least one of those snapshots from an existing snapshot in order to generate the 8:30 AM snapshot.

Figure 7:
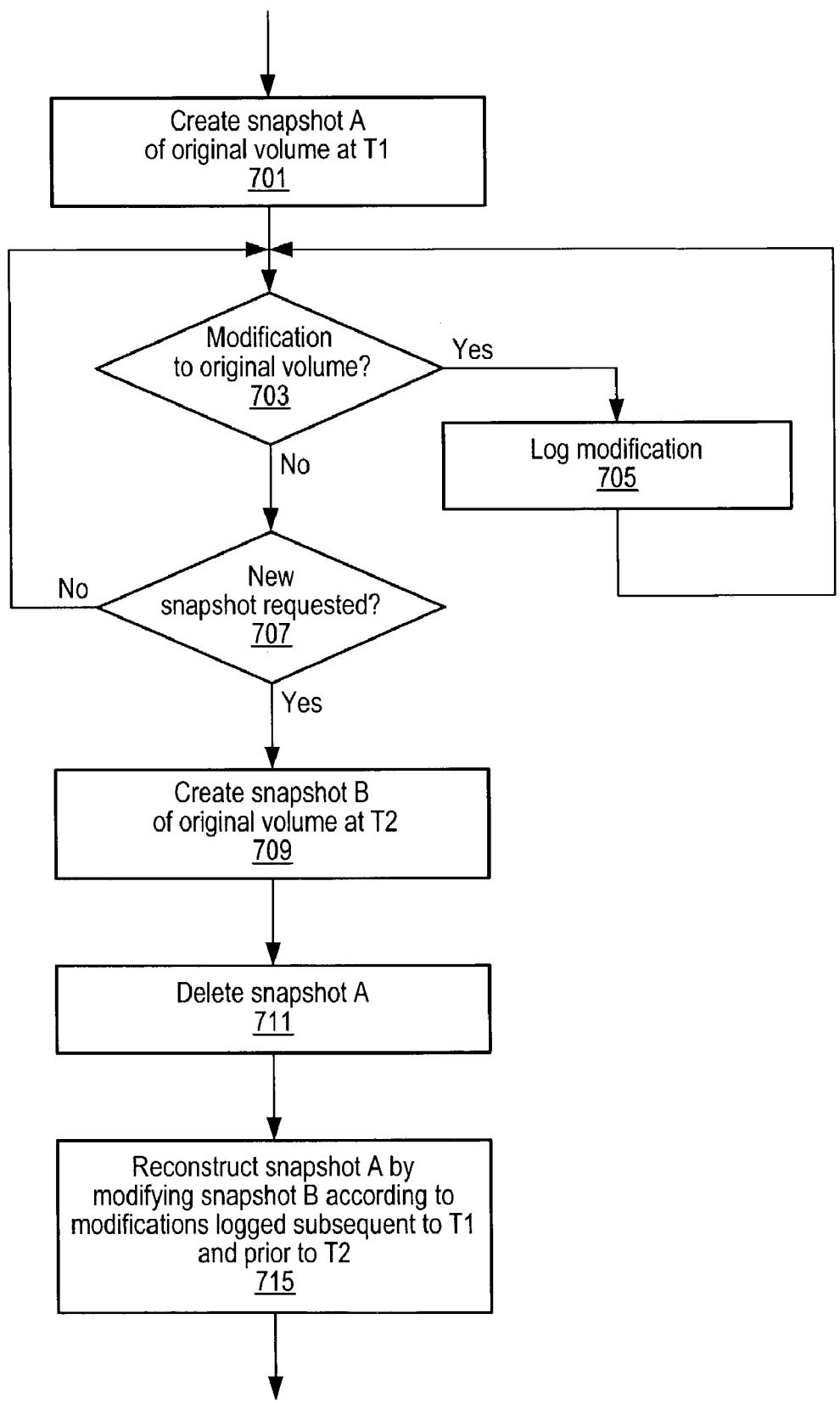
FIG. 7 is a flowchart of one embodiment of a method of reconstructing a deleted snapshot from an existing snapshot and logged modifications.

FIG. 7 is a flowchart illustrating one embodiment of a method of reconstructing a deleted snapshot from an existing snapshot and one or more modification logs. As indicated at 701, at time T1, a snapshot A of an original volume is created. Function 701 may be performed in a variety of ways (e.g., by establishing a virtual device or by disconnecting a synchronized mirror volume). At 703 and 705, any modifications to the original volume are logged. Modifications may be logged from the time T1 at which snapshot A is created (or, in most embodiments, from a preceding time) until at least the creation time of the next snapshot of the original volume. In many embodiments, modifications may continue to be logged between the times at which subsequent snapshots of the original volume are created. All or part of the modification log(s) created at 705 may be stored online (e.g., as part of a data volume stored on one or more hard disks) or offline (e.g., on a tape backup device).

As indicated at 707–709, a new snapshot B of the original volume is created at time T2, which is subsequent to time T1, in response to a request for a new snapshot. A request for a new snapshot may include a user request, a time-triggered interrupt (e.g., if the system is configured to periodically generate new timestamps), or an event-triggered interrupt (e.g., if the system if configured to generate new timestamps in response to the occurrence of certain conditions). Note that functions 703 and 705 may continue to be performed after performance of function 709.

At some point, snapshot A may be deleted, as indicated at 711. Note that function 711 may be performed at any point subsequent to function 701 and prior to function 713. Snapshot A may be deleted in response to a user request (e.g., to free storage space occupied by snapshot A), as part of the creation of a new snapshot (e.g., snapshot A may be overwritten by snapshot B), or due to data corruption or hardware failure.

At 713, a copy of the deleted snapshot A is reconstructed. In some embodiments, the deleted snapshot may be reconstructed in response to a request to restore all or part of the original volume to its state at time T1. The deleted snapshot A is reconstructed by modifying snapshot B according to modifications logged at 705 subsequent to time T1 (the time at which snapshot A was created) and prior to time T2 (the time at which snapshot B was created). For example, the modification log(s) created at 705 may identify data blocks modified between T1 and T2 and the pre-modification values of those modified blocks. Snapshot B may be modified by replacing those blocks with blocks having the pre-modification values identified in the modification log(s).

Reconstructing snapshot A may involve accessing and/or copying snapshot B (e.g., by restoring the original volume to its state at time T2) and accessing the portion of the modification log(s) storing modifications detected between T1 and T2, which may be stored in an offline storage device. However, since snapshot B is available from an online source, and since a relatively small amount of block-level information may be stored in the relevant portion of the modification log(s), accessing the appropriate existing snapshot and modification information may take significantly less time than it would take to access a backup made from snapshot A from an offline storage device.

Figure 8:
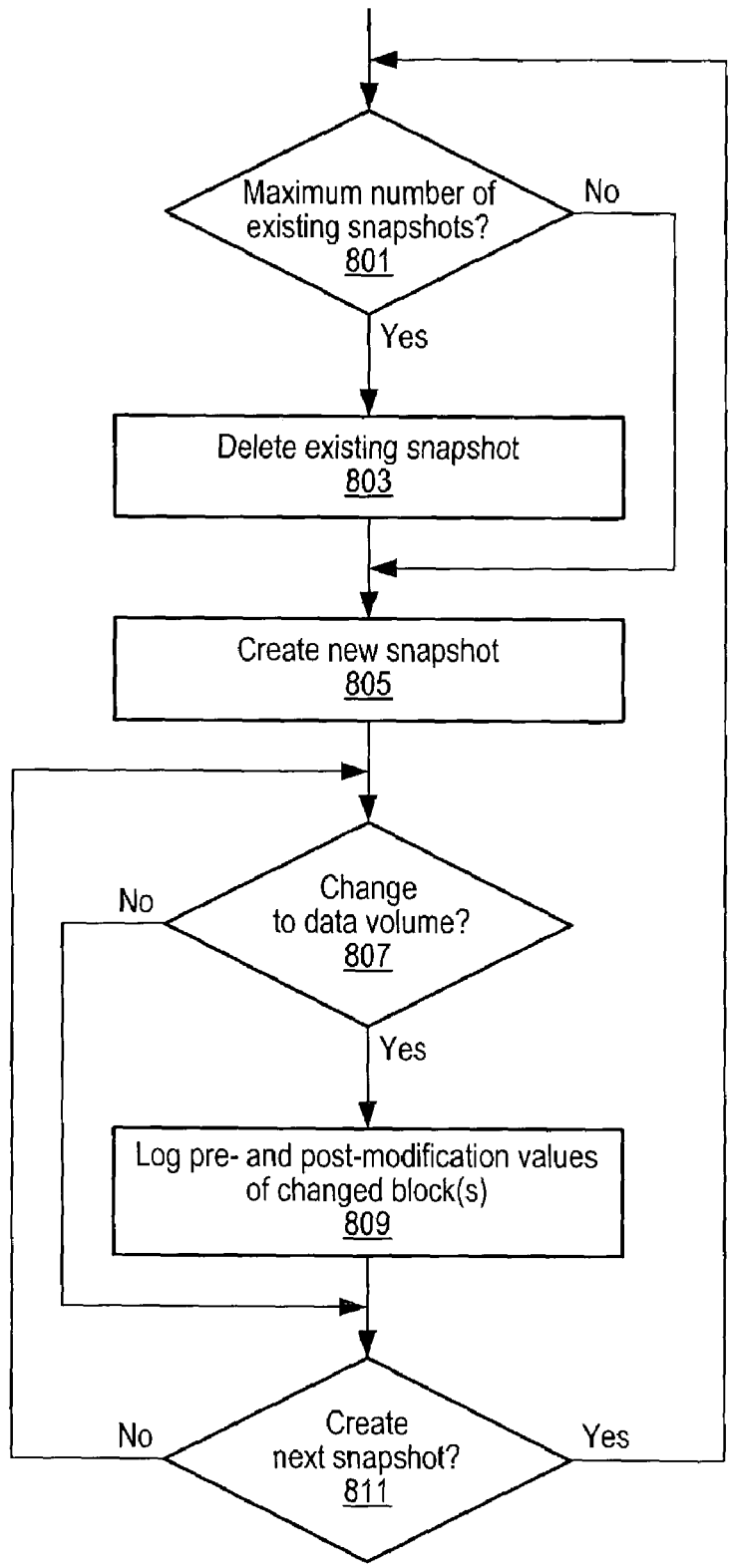
FIG. 8 is a flowchart illustrating snapshot creation and deletion and modification logging, according to one embodiment.

FIG. 8 illustrates how snapshots may be created and deleted and how changes to the original data volume may be logged, according to one embodiment. As indicated at 801–805, if a maximum number of snapshots currently exist, an existing snapshot may be deleted in order to create a new snapshot. If one or more changes to the data volume from which the snapshots are generated are detected at 807, the change(s) may be logged at 809 by time stamping the change relative to a time at which a snapshot is created and identifying the pre- and/or post-modification values of the changed block(s). At 811, if a new snapshot is to be generated, the method may return to function 801. Otherwise, changes to the original volume relative to the snapshot generated at 805 may be logged at 807–809.

Note that in alternative embodiments, modifications may be logged by comparing two successively-generated snapshots to determine whether any blocks have been modified between the creation times of those two snapshots (or by examining a bitmap that identifies which blocks were modified between the creation times of those snapshots) and, if any modifications occurred, retrieving the pre- and post-modification values from those two snapshots and storing these values (e.g., in "backward" and "forward" modification logs as described above) for later use.

Figure 9:
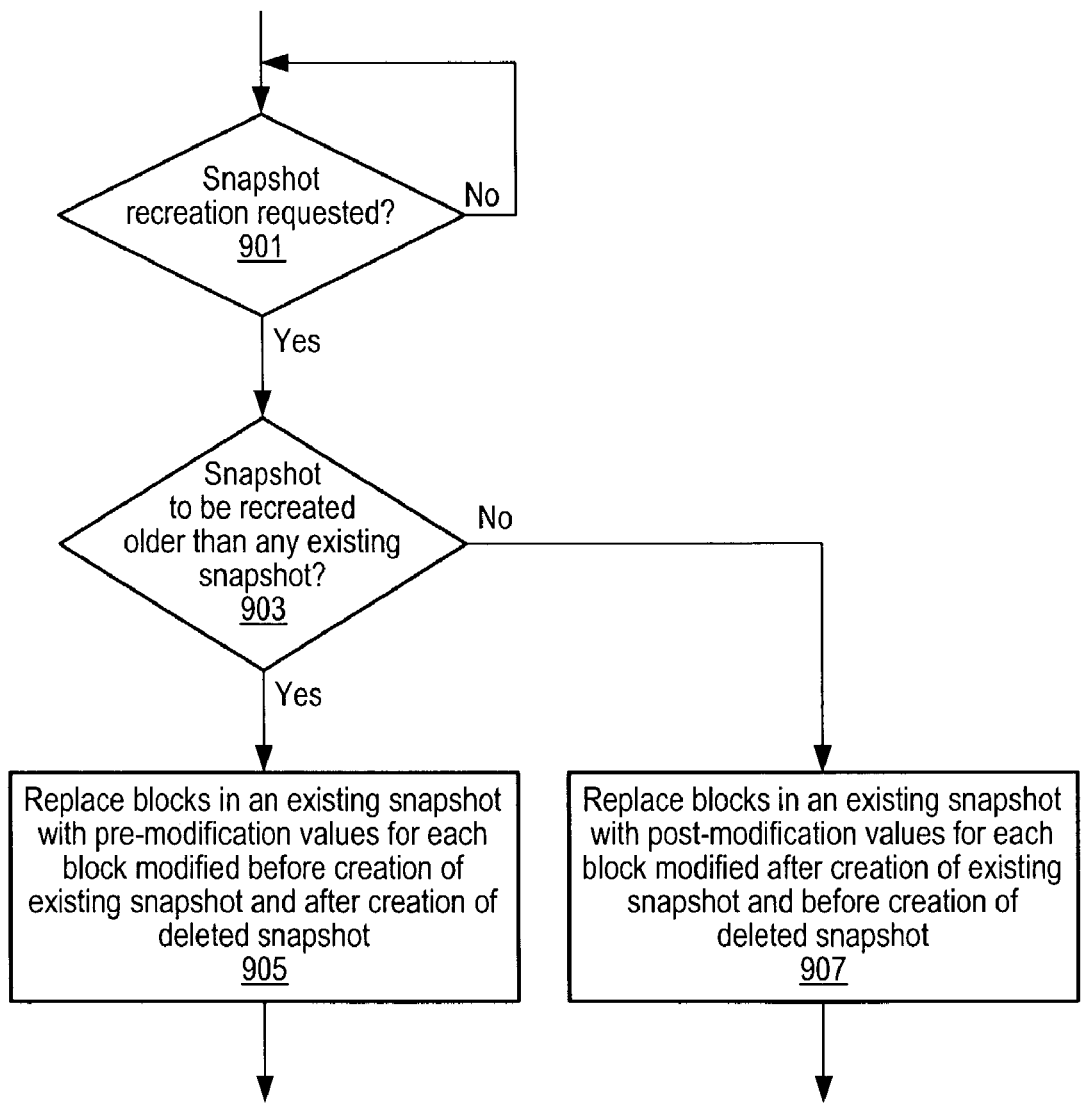
FIG. 9 is a flowchart illustrating another embodiment of a method of reconstructing a deleted snapshot from an existing snapshot and logged modifications.

FIG. 9 illustrates another embodiment of a method of reconstructing a deleted snapshot from an existing snapshot and one or more modification logs. At 901, the reconstruction of a deleted snapshot is requested. If the snapshot to be reconstructed is older than any existing snapshot (as determined at 903), the snapshot may be reconstructed from an existing snapshot by replacing blocks in an existing snapshot with pre-modification values for each block modified before creation of the existing snapshot and after creation of the deleted snapshot, as shown at 905. If the snapshot to be reconstructed was created after the existing snapshots, the snapshot may be reconstructed by replacing blocks in an existing snapshot with post-modification values for each block modified after creation of existing snapshot and before creation of deleted snapshot, as shown at 907.

Various embodiments may further include receiving, sending or storing instructions and/or data that implement the database snapshot functionality in accordance with the foregoing description upon a computer readable medium. Generally speaking, a computer readable medium may include storage media or memory media such as magnetic or optical media, e.g., disk or CD-ROM, volatile or non-volatile media such as RAM (e.g., SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   creating a first snapshot of a data volume;
   logging modifications to the data volume in one or more modification logs, wherein the modifications occur subsequent to said creating the first snapshot, wherein the one or more modification logs identify a post-modification value of at least one modified block of the data volume;
   creating a second snapshot subsequent to said creating the first snapshot; and
   if the first snapshot is deleted, reconstructing the first snapshot by modifying the second snapshot according to the one or more modification logs.

2. The method of claim 1, wherein said creating the first snapshot involves creating a volume-level mirror of the data volume.

3. The method of claim 1, further comprising storing at least a portion of the one or more modification logs on a backup storage media.

4. The method of claim 3, wherein the backup storage media is a tape drive, and wherein the data volume is comprised on one or more hard drives.

5. The method of claim 3, wherein said reconstructing comprises reading the second snapshot from an online storage media and reading the at least the portion of the one or more modification logs from the backup storage media.

6. The method of claim 5, wherein said reading the at least the portion of the one or more modification logs from the backup storage media involves waiting for the backup storage media to enter an online state.

7. The method of claim 1, wherein said reconstructing comprises accessing the one or more modification logs to determine which blocks included in the data volume were modified after said creating the first snapshot and before said creating the second snapshot, wherein the one or more modification logs identify a pre-modification value and a post-modification value of each modified block, and wherein said modifying comprises replacing each modified block in the second snapshot with the pre-modification value.

8. The method of claim 1, further comprising reconstructing a third snapshot from the second snapshot by modifying the second snapshot according to the one or more modification logs, wherein the third snapshot is created after the second snapshot.

9. The method of claim 8, wherein said reconstructing the third snapshot comprises accessing the one or more modification logs to determine which blocks included in the data volume were modified after said creating the second snapshot and before creating the third snapshot, wherein the one or more modification logs identify a pre-modification value and a post-modification value of each modified block, and wherein said modifying comprises replacing each modified block in the second snapshot with the post-modification value.

10. A computer system, comprising:
    one or more microprocessors;
    a memory coupled to the one or more microprocessors, the memory storing program instructions executable by the one or more microprocessors to:
    create a first snapshot of a data volume;
    log modifications to the data volume detected subsequent to creation of the first snapshot, including a post-modification value of at least one modified block of the data volume, in one or more modification logs;
    create a second snapshot; and
    if the first snapshot is deleted, reconstruct the first snapshot by modifying the second snapshot according to the one or more modification logs.

11. The computer system of claim 10, wherein the program instructions are executable by the one or more microprocessors to create the first snapshot by creating a volume-level mirror of the data volume.

12. The computer system of claim 10, further comprising a backup storage media, wherein the program instructions are executable by the one or more microprocessors to store at least a portion of the one or more modification logs on the backup storage media.

13. The computer system of claim 12, wherein the backup storage media is a tape drive, and wherein the data volume is comprised on one or more hard drives included in the computer system.

14. The computer system of claim 12, wherein the program instructions are executable by the one or more microprocessors to reconstruct the first snapshot by reading the second snapshot from an online storage media included in the computer system and reading the at least the portion of the one or more modification logs from the backup storage media.

15. The computer system of claim 14, wherein the program instructions are executable by the one or more microprocessors to read the at least the portion of the one or more modification logs from the backup storage media after waiting for the backup storage media to enter an online state.

16. The computer system of claim 10, wherein the program instructions are executable by the one or more microprocessors to reconstruct the first snapshot by accessing the one or more modification logs to determine which blocks included in the data volume were modified after creation of the first snapshot and before creation of the second snapshot, wherein the one or more modification logs identify a pre-modification value and a post-modification value of each modified block, and wherein said modifying comprises replacing each modified block in the second snapshot with the pre-modification value.

17. The computer system of claim 10, wherein the program instructions are executable by the one or more microprocessors to reconstruct a third snapshot from the second snapshot by modifying the second snapshot according to the one or more modification logs, wherein the third snapshot is created after the second snapshot.

18. The computer system of claim 17, wherein the program instructions are executable by the one or more microprocessors to reconstruct the third snapshot by accessing the one or more modification logs to determine which blocks included in the data volume were modified after said creating the second snapshot and before creating the third snapshot, wherein the one or more modification logs identify a pre-modification value and a post-modification value of each modified block, and wherein said modifying comprises replacing each modified block in the second snapshot with the post-modification value.

19. A computer readable medium including program instructions executable to:
create a first snapshot of a data volume;
log modifications to the data volume detected subsequent to creation of the first snapshot, including a post-modification value of at least one modified block of the data volume, in one or more modification logs;
create a second snapshot; and
if the first snapshot is deleted, reconstruct the first snapshot by modifying the second snapshot according to the one or more modification logs.

20. The computer readable medium of claim 19, wherein the program instructions are executable to create the first snapshot by creating a volume-level mirror of the data volume.

21. The computer readable medium of claim 19, wherein the program instructions are executable to reconstruct the first snapshot by accessing the one or more modification logs to determine which blocks included in the data volume were modified after creation of the first snapshot and before creation of the second snapshot, wherein the one or more modification logs identify a pre-modification value and a post-modification value of each modified block, and wherein said modifying comprises replacing each modified block in the second snapshot with the pre-modification value.

22. The computer readable medium of claim 19, wherein the program instructions are executable to reconstruct a third snapshot from the second snapshot by modifying the second snapshot according to the one or more modification logs, wherein the third snapshot is created after the second snapshot.

23. The computer readable medium of claim 22, wherein the program instructions are executable to reconstruct the third snapshot by accessing the one or more modification logs to determine which blocks included in the data volume were modified after said creating the second snapshot and before creating the third snapshot, wherein the one or more modification logs identify a pre-modification value and a post-modification value of each modified block, and wherein said modifying comprises replacing each modified block in the second snapshot with the post-modification value.

24. A computer system, comprising:
one or more storage devices, wherein a data volume is stored on one or more of the storage devices, and wherein a plurality of snapshots of the data volume are stored on one or more of the storage devices;
a snapshot manager coupled to the one or more storage devices, wherein the snapshot manager is configured to reconstruct a deleted snapshot of the data volume from one of the plurality of snapshots;
a modification manager coupled to the one or more storage devices and configured to log modifications to the data volume, including a post-modification value of at least one modified block of the data volume, relative to a creation time of each of the plurality of snapshots and a creation time of the deleted snapshot;
wherein the snapshot manager is configured to reconstruct the deleted snapshot by modifying the one of the plurality of snapshots according to the modifications logged by the modification manager.

25. A system, comprising:
means for storing a portion of a plurality of snapshots of a data volume;
means for logging modifications to the data volume, including a post-modification value of at least one modified block of the data volume, relative to a creation time of each of the plurality of snapshots;
means for reconstructing a deleted snapshot of the plurality of snapshots from an existing snapshot of the portion of the plurality of snapshots by modifying the existing snapshot according to the modifications logged subsequent to a creation time of the deleted snapshot and prior to a creation time of the existing snapshot, wherein the creation time of the deleted snapshot is earlier than the creation time of the existing snapshot.

* * * * *